United States Patent Office 2,940,729
Patented June 14, 1960

2,940,729

CONTROL SYSTEM FOR SOIL STABILIZER POLYMERIZATION

David H. Rakowitz, Riverside, Conn., assignor to American Cyanamid Company, New York, N.Y., a corporation of Maine No Drawing. Filed Mar. 11, 1957, Ser. No. 645,009

13 Claims. (Cl. 255—1.8)

The present invention relates to methods for the stabilization of soils with polymeric material and more particularly to a novel process of controlling activation of the stabilizer polymerization reaction in the presence of natural soils. In a more detailed scope the present invention relates to the use of a cyanide compound such as ferrocyanide or ferricyanide to control gelation of soil stabilizer in applications where temperatures are relatively high such as in oil well drilling or deep mine shafts.

The soil stabilizers contemplated for use in the present invention are those disclosed and claimed in the copending U.S. patent application of Morgan and Padbury, Serial No. 528,542, now U.S. Patent No. 2,801,984, i.e. containing between about 3 and about 200 parts by weight of soil to 1 part of a water-soluble copolymerizable mixture containing between about 0.005 and 0.2 part of one or more selected alkylidene bisacrylamides and one or more selected ethylenic monomers. Upon polymerization, the polymer-soil aggregate is stabilized to a condition of insolubility in water and other inert liquids such as oils, light hydrocarbons and the like.

Although the present invention may be advantageously applied to the stabilization of soil for the various purposes described in the above-mentioned copending application, it is especially valuable in connection with problems encountered in drilling for, and producing, oil or gas from wells.

Among the problems in the drilling and production of oil from oil wells are:

1.—WATER SEEPAGE

New drilling techniques using air, natural gas or aerated lime water as a drilling fluid instead of drilling muds have resulted in improving drilling rates by over 500%. However, seepage of water from fine, water-bearing sand formations tends to destroy the water-gas balance. Attempts have heretofore been made to force soil stabilizer solutions into these formations when they are encountered, but due to high temperatures, gelation occurs erratically or at best only in the first few inches around the periphery of the hole. Although this may be effective to seal off water initially, the static pressure, ranging up to 10,000 p.s.i. depending on depth, eventually forces the water through them. Similar problems are encountered in sinking deep mine shafts. The only alternative treatment available at the present time is to replace all the aerated water with heavy, expensive drilling mud. The mud must have enough weight to overcome the pressure forcing water from the formation into the drill hole. The need to use drilling mud and its concurrent slow rate is of course what these new drilling methods are attempting to eliminate. Many alternative chemical treatments have been evaluated, but they all have the limitation of too high a viscosity to be pumped into the relatively impermeable sands without fracturing the formation.

2.—DRILLING FLUID LOSS

A second problem is in sealing cracks or small fissures around an oil well during drilling. When these are encountered, the drilling fluid gradually drains away instead of recirculating as it should. Many materials including cow dung, corn husks, cement, hydrating clay and any other available, bulky products have been used to overcome this condition when the fissures are large. The lighter weight drilling fluids described above can be lost into smaller cracks. It is the smaller cracks which cannot be successfully plugged with presently-available methods.

3.—CONING

A third problem is in operating producing wells which, due to leaks, produce water with the oil. This problem is called coning. When an oil-bearing zone lies directly above an oil- and water-bearing zone, water gradually begins to be recovered with the oil due to the relatively greater permeability of its zone and due to the pressure differential. According to the present invention, these problems may be overcome through the use of low viscosity polymerization inhibited stabilizer solutions which can be forced into porous zones and fissures around the well, not only displacing the water, but also preventing its re-entrance by forming a barrier of gelled stabilizer.

As mentioned, the prior attempts to use a soil stabilizer as an aid in solving these oil well problems have been to a considerable extent, unsuccessful due to the relatively high temperatures (80–125° F.) encountered and the longer gel time required for effective results in application. I have now discovered that by the incorporation of a water-soluble ferricyanide or ferrocyanide into the stabilizer that premature gelation of the stabilizer may be effectively inhibited upon injection into oil wells.

It is accordingly the object of the present invention to provide for a more effective use of soil stabilizer by control of the gelation through use of an inhibitor. It is a further object of the present invention to provide a stabilizer solution suitable for use in sinking deep shafts into earth formations in which gelation is inhibited until its polymerization in situ may be effected so as to provide its optimum benefit. Further objects will become apparent as the description of the invention proceeds.

In soil stabilization, the product applied to the soil should preferably be in a form permitting easy application thereof to the soil. For example, it may be a substantially nonviscous liquid that can be pumped into a soil as a grout, i.e., a thin slurry or solution which on injection into permeable soils inhibits water permeations; or it may be in a solid pulverent form which may readily be evenly distributed upon, or mixed with, the soil, dissolved and thereafter polymerized in the soil.

The chemical reactions or polymerizations of these materials are generally sensitive to variables, such as pH and temperature, which have an important bearing on the successful use of these materials. At higher temperatures, gelation may occur prematurely and so rapidly that not only is the stabilizer rendered ineffective but the clogging due to gelation at the wrong place becomes a serious obstruction.

In operation, the stabilizer material as employed in the invention involves the incorporation in the soil of a polymerizable material which is capable not only of forming a gel by polymerization rather than merely to be mixed with the soil as in the case of an inert filler. The gelled polymeric structure which is formed is a liquid-impermeable barrier of itself effectively adhering to and sealing crevices and fissures and when injected into soil, forms an impermeable and substantially strengthened soil aggregate.

In attempting to control the gelation of stabilizer solutions, I have discovered that when an inhibitor such as a ferricyanide or ferrocyanide is added to a stabilizer solution of the comonomers containing the catalyst system, as hereinafter more fully described, excellent control and an extremely useful composition is obtained. The effect appears unusual inasmuch as it would be expected that compounds of this type would activate rather than inhibit polymerization. The activation of polymerizable materials is shown as for example in British Patent No. 590,191.

The stabilizer solutions which may be employed are such as the copolymerizable mixtures described in the aforementioned U.S. Patent No. 2,801,984. These mixtures comprise various alkylidene bisacrylamides having the formula:

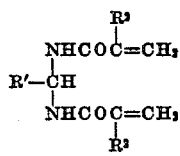

in which

is a hydrocarbon residue of an aldehyde and $R^2$ is a member of the group consisting of hydrogen and a methyl radical.

The other comonomer in these mixtures is a solid, liquid or gaseous ethylenic (i.e., contains a $>C=C<$ radical) compound with a solubility of at least about 2% by weight, and preferably at least about 5%, in water and which copolymerizes with the aforesaid bisacrylamides in an aqueous system. Although not essential in practicing the invention, it is preferred to select an ethylenic comonomer which is preferably soluble or at least self-dispersible in water with appropriate stirring, such as N,N'-methylenebisacrylamide, which is itself capable of homopolymerizing.

It has been found that the successful use of soil stabilizers in sinking oil wells and other deep shafts into earth formations depends on the control, or ability to control polymerization of the stabilizing material following injection thereof into the soil, and this is so particularly when injecting the chemical stabilizer under pressure to force it into fissures and soil formations which have a substantial resistance to permeation. In such cases unless the reaction is controllable, gelation is effected prematurely, resulting in skin-like gelation and/or a clogging uneven gel rather than a uniform impermeable mass. When this takes place, the desired effect is of course largely lost. The inhibited stabilizer solution of the present invention has the advantage of permitting timely polymerization of the polymerizable material at a time when the polymerizable material is in the best physical location thereby providing the maximum stabilizing effect. In certain instances, the inhibition of gelation for as long as 10 hours or even more may be desirable. As a rule, however, inhibiting the reaction for a time of between 1 and 5 hours is suitable for most applications where delayed gelation is needed.

The composition of the invention may be used beneficially to seal fissures and crevices in stone or rock or other subterranean formation or with any soil including silt, sands, loams, clays, etc., both naturally occurring and those which have been processed by mining, washing, etc., such as bentonite, kaolinite and the like. Soil mixtures are also within the scope of the invention, including such materials as oil well drilling muds. Thus, the term "soil" is used herein in a broad sense and expressions such as "ground" and "earth" are employed to denote the solid surface of the earth and its interior.

Any copolymerizable composition containing an alkylidene bisacrylamide according to the above formula and an ethylenic comonomer of the type described may be employed in practicing the present invention to produce a barrier or soil mass of decreased water permeability and/or improved load-bearing properties by conversion of the soil composition to a substantially water-insoluble state. This conversion appears to be brought about by an addition or vinyl type polymerization with cross-linking by the bisacrylamide resulting in a three-dimensional structure.

In addition to the comonomer N,N'-methylene bisacrylamide set out in the examples hereinafter, any of the alkylidene bisacrylamides corresponding to the above formula which are described and claimed in Lundberg Patent No. 2,474,846 or mixtures thereof may be used as cross-linking agents. Only slight solubility is required of the alkylidene bisacrylamide in view of the small amount used; therefore, this component may have a water solubility as low as about 0.02% by weight at 20° C. but a solubility of at least about 0.10% is more desirable for general purposes.

A wide variety of ethylenic comonomers or mixtures thereof are copolymerizable with the alkylidene bisacrylamides; those having the formula containing at least one $>C=C<$ group, referred to as the ethenoid group in the aforementioned patent of Morgan and Padbury and which have appreciable solubility in water, are suitable for use in the present invention. The water solubility of these substances is known to depend chiefly on the number and type of hydrophilic and hydrophobic radicals therein; for example, the water solubility of compounds.

Among the water-soluble ethenoid monomers, those containing an acrylyl or methacrylyl group are especially recommended. These are exemplified by N-methylol acrylamide, calcium acrylate, methacrylamide and acrylamide. Other suitable ethenoid compounds are such as those disclosed in the copending U.S. patent application of Roy W. Roth, Serial No. 585,668, filed May 18, 1956, now U.S. Patent No. 2,801,985.

The inhibitor employed may be one or more of the substantially water-soluble alkali metal and alkali earth metal, ferrocyanides, or ferricyanides, such as potassium, sodium, lithium, calcium, magnesium, ferrocyanides and ferricyanides. The amount of these inhibitors may vary over fairly wide limits. Thus, from about 0.01 to about 50% based on the weight of polymerizable material may be employed. For most purposes an amount from about 0.1 to about 10% is sufficient. Compounds of this group are not only excellent inhibitors in connection with soil stabilizers, but they furthermore have substantially no adverse effect on gel strength as is the case with various other potential inhibitors such as hydroquinone and sodium nitrite for example.

Polymerization, according to the invention, may be activated by employing a single component or a redox catalyst system. Suitable catalysts are such as the water-soluble oxygen-containing catalysts, e.g. ammonium, potassium and sodium persulfates, hydrogen peroxide, the alkali metal and ammonium perchlorates and the like. A redox catalyst system may also be used. As the oxidizing component in redox systems, any of the usual water-soluble peroxy catalysts, derived from peracids such as persulfuric, perchloric, perboric and permanganic and their salts may be employed. For example, ammonium, potassium and sodium persulfates, hydrogen peroxide, the alkali metal and ammonium perchlorates, and the like may be employed. As the reducing agent for redox catalyst systems various reducing components such as sodium thiosulfate, sodium or potassium bisulfite or metabisulfate, nitrilotrispropionamide and the like may be used. Illustrative examples of suitable redox catalyst systems are ammonium persulfate-sodium thiosulfate, ammonium persulfate-nitrilotrispropionamide, and potassium persulfate-nitrilotrispropionamide systems. A mixture of the two catalyst components in a redox system in quantities corresponding to their oxidation-reduction equivalents is not a requirement but may be desirable for some purposes.

In general, a minimum of about 0.1% catalyst based on the weight of polymerizable monomers is desirable, although amounts of as little as 0.01% and up to about 25% may be employed. Preferably amounts of from about 0.5% to about 10% based on the weight of the monomers are employed. With acrylamide and methylene bisacrylamide as the comonomers, it has been found desirable to use about 0.25% to 5% by weight, based on the weight of the monomers, of each of the components of the redox catalyst. The inhibited stabilizer solution may be employed in conjunction with a buffering agent which resists changes in the hydrogen ion concentration due to the nature of the area to be treated. The use of buffer systems for soil stabilizers of the type herein dealt with and which may be used together with the inhibited stabilizer of the present invention are such as those described in the U.S. patent application of Henry Z. Friedlander, Serial No. 645,261. Illustrative examples of such buffering agents are such as sodium phosphate, disodium phosphate, acetic acid, sodium acetate, carbonate and bicarbonate, etc. Such agents may be so selected as not only to resist the change in pH but the stabilizer solution may be adjusted to and buffered to the most favorable pH for the particular application concerned. As disclosed in the above-mentioned application, amounts of buffering agent may vary from between about 0.01% to about 10% based on the weight of polymerizable material; however, when used in conjunction with the ferrocyanides and ferricyanides of the present invention, I have found that amounts of up to about 100% of buffering agent based on the polymerizable material is sometimes desirable.

The presence of buffering agent has been found particularly desirable when the inhibited stabilizer solution is employed in the presence of metallic iron, e.g. iron or steel pipes or drilling equipment or other source of this metal. The presence of iron has the disadvantage in that it has a tendency to cause a partial precipitation of the polymerizable material from solution, particularly at low pH, i.e. at a pH of 7 or below. I have found that under these conditions best results are obtained when working in the pH range of between about 7 and 10.5. Thus by adding sufficient buffering agent to provide a pH within this range this disadvantage, when conditions give rise to it, may be avoided.

When permeating soil the amount of stabilizer material to soil being treated may vary widely. The ratio of polymerizable material, which generally comprises from about 0.5% to about 20% alkylidene diacrylamide, and preferably about 3 to 10% based on total polymerizable material, to the amount of soil may vary widely but is normally in the range of about 1 part by weight of polymerizable material to between about 3 to about 200 parts by weight of soil. The preferred range is between about 20 and about 100 parts of soil per part of polymerizable material.

Ordinarily, the polymerizable material is dissolved in water to form a solution which is conveniently pumped into the earth formation, often under pressure or otherwise mixed with soil. The concentration of the solution and the quantity used may be regulated so that the concentration of water in the final mixture of soil and stabilizing component varies anywhere between about 5% and about 50% by weight, depending primarily on the type of soil. Sand, for example, requires much less water than do certain of the clays. The proportions of water used determines to some extent the properties of the resulting stabilized soil. It appears that the optimum conditions for polymerization are realized with sufficient water present to saturate the soil, that is, to fill all voids between soil particles and pores therein with the solution of mixed monomers, at the desired degree of compaction when polymerization occurs. The invention, however, is not limited to saturated soil compositions, as substantial advantages are obtained with only partly saturated soil masses.

When employed to seal crevices or fissures in underground formations the inhibited stabilizer solution is forced down into these formations in sufficient quantities to fill these voids and under sufficient pressure to offset static pressure which may range up to 10,000 p.s.i. depending on depth.

The stabilizer composition of the invention may be applied to the soil by use of any of the various techniques described in the heretofore mentioned U.S. Patent No. 2,801,985. In particular, however, I have found its greatest utility is in its application to oil wells where temperatures are substantially higher and where the polymerization conditions are more critical than those normally encountered in the use of soil stabilizers.

Copolymers of the type herein employed upon polymerization are equally impermeable to water, crude petroleum, and other substantially inert liquids and may be employed for lining or stabilizing wells, pits, quarries, and other earth recesses.

In the application of the inhibited solution of the invention for plugging or blocking porous formations and fissures in a mine shaft or oil well through which a drilling mud is being lost or where seepage of water into the oil is taking place, either of two ways may be employed. The polymerizable mixture of monomers and the catalyst may be mixed with available soil or spent drilling mud for economy and pumped through the interior of the drill pipe or shaft for an appropriate interval; or if voids in the porous formation surrounding the bore are not too large, an aqueous dispersion or solution of the monomeric mixture and the catalyst alone may be pumped through the drill pipe into the porous earth to be sealed. The latter case is analogous to an independent injection method whereby the copolymerizable components including activator and inhibitor of the stabilizer compositions are injected into the soil by driving perforate injection nozzles or pipes into the earth at appropriately spaced intervals without excavating. The aqueous mixture of the alkylidene diacrylamide and the ethenoid comonomer is pumped into the ground under sufficient pressure to force the mixture out into the soil for a considerable distance from the injection point and at the appropriate time polymerized in situ.

The compositions described herein are also useful in various other applications where the temperature or other conditions make it necessary or desirable to have a relatively long gel time, for example, in grouting around steam lines; cementing of liners or casings in channels in the earth, as when cementing an oil well casing in place after it has been lowered into the well. This latter operation may be accomplished by pumping a slurry of soil, e.g., spent drilling mud, water monomer mixture and catalyst, down the interior of the casing and into the space between the exterior of the casing and the sides of the well. The inhibitor of the invention insures against premature polymerization while the slurry is being injected or otherwise introduced into place where stabilization is desired. The composition of the invention has an important advantage in that the catalyst need not be omitted from the slurry but may be introduced at the same time and in one operation with the aqueous solution in amounts so that polymerization does not occur until the stabilizer has permeated fully, even though high temperatures are encountered.

This invention has wide utility for any purpose in which it is desired to provide an impermeable barrier in porous or creviced formations or to cohere and strengthen soil masses, to impart high viscosity, solid or rubber-like properties, to minimize or substantially eliminate the permeability of soil to water and other substantially inert liquids, and to increase resistance to leakage or erosion by moving liquids.

In order that the present invention may be more fully understood, the following examples are set forth for purposes of illustration only and any specific enumeration of details should not be interpreted as a limitation, except as expressed in the appended claims.

Procedure 100 parts of New Jersey washed soil is added to a stabilizer solution comprising 90 parts of water and 10 parts of AM-955 (a comonomer mixture of 95 parts acrylamide and 5 parts methylene bisacrylamide) containing appropriate amounts of catalyst and the mixture is polymerized. The gel time at a given temperature is compared between those compositions containing the inhibitor of the invention with those in which the inhibitor is omitted. All parts and percentages are by weight based on the weight of the monomers unless otherwise specified

EXAMPLE 1

Following the procedure above, soil is added to a 10% solution of AM-955 and 12% (based on AM-955) ammonium persulfate (AP) at a temperature of 50°. Polymerization is complete in 5 minutes.

EXAMPLE 2

Example 1 is repeated employing the same temperature with the exception that 0.5% potassium ferricyanide is introduced into the mixture. The time for polymerization exceeds 4 hours and 20 minutes.

EXAMPLE 3

Example 1 is repeated with the exception that instead of using 12% ammonium persulfate, an activator comprising 6% ammonium persulfate and 32% disodium hydrogen phosphate ($Na_2HPO_4 \cdot 7H_2O$) as a buffering agent is used. Polymerization is complete in 10 minutes.

EXAMPLE 4

Example 3 is repeated with the exception that 0.8% sodium ferricyanide monohydrate is added to the mixture. Time required for polymerization exceeds 6 hours.

EXAMPLE 5

The soil is added to a 10% solution of AM-955 and an activator comprising 12% ammonium persulfate and 32% disodium hydrogen phosphate ($Na_2HPO_4 \cdot 7H_2O$). At a temperature of 50° C. the polymerization is complete in 4 minutes.

EXAMPLE 6

Example 5 is repeated with the exception that 2.4% of the inhibitor sodium ferrocyanide decahydrate is added. Polymerization requires more than an hour and 3 minutes.

EXAMPLE 7

Soil is added to a 10% solution of AM-955 containing as activator 1.5% ammonium persulfate and 1.5% nitrilo-trispropionamide (NTP). At 30° C. polymerization is complete in 12 minutes.

EXAMPLE 8

Example 7 is repeated with the exception that 0.08% potassium ferricyanide is included in the mixture. Polymerization requires more than 16 hours.

EXAMPLES 9-13

The procedure, ingredients and conditions employed in Example 2 are repeated with the exception that 48% buffering agent, disodium hydrogen phosphate and varying amounts of potassium ferricyanide are employed as stated in the following table together with the results obtained.

Table I

| Example | Weight Percent of Potassium Ferricyanide | Gel Time (min.) |
|---|---|---|
| 9 | 0.4 | 69 |
| 10 | 0.8 | 110 |
| 11 | 1.6 | 170 |
| 12 | 3.2 | 252 |
| 13 | 6.4 | 364 |

The undesirable effect of various known polymerization inhibitors when applied to soil stabilizers of the present invention is illustrated by the effect of hydroquinone on gel time and gel strength of stabilizer mixtures when compared with mixtures containing no inhibitor and again with mixtures wherein potassium ferricyanide is employed as inhibitor. The relative gel strength is measured by a technique based on the procedure described in Reedman, R; Can. J. Res., D 21 324, 1943, as follows: The technique involves as measurement of the force required to drive a glass rod a given distance into the gel.

EXAMPLE 14

The procedure employed in Example 7 is followed using a 10% solution of AM-955 and 1.5% of ammonium persulfate, but employing instead 2.4% of nitrilo-trispropionamide. The procedure is carried out at 30° C. The results obtained are tabulated below.

Table II

| Weight and Inhibitor | Gel Time, minutes | Strength |
|---|---|---|
| 0 | 7 | 14 |
| 0.075% Hydroquinone | 11 | 13 |
| 0.15% Hydroquinone | 13 | 12 |
| 0.37% Hydroquinone | 27 | 3 |
| 0.04% Ferricyanide | 800 | 14 |
| 0.08% Ferricyanide | 1,050 | 13 |
| 0.15% Ferricyanide | 1,800 | 12 |
| 0.37% Ferricyanide | 3,000 | 11 |

I claim:

1. A process for treating areas of soil and subterranean formations which comprises applying to said areas a copolymerizable mixture comprising (a) a monomeric alkylidene bisacrylamide of the formula

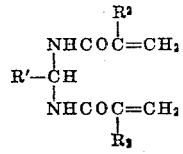

in which

is a hydrocarbon residue of an aldehyde and $R^2$ is of the group consisting of hydrogen and methyl, and (b) another ethylenic monomer copolymerizable with (a) the relative weight of (a) to (b) being within the range of from about 0.005:1 to about 0.2:1, respectively and converting said polymerizable mixture in situ to a substantially water-insoluble state by a copolymerizable reaction in the presence of a polymerization control system comprising a catalyst and from about .01 to about 50% based on the weight of the copolymerizable material, of a compound selected from the group consisting of ferrocyanides and ferricyanides as gelation inhibitor.

2. A process according to claim 1 in which the alkylidene-bisacrylamide comprises N,N'-methylene bisacrylamide.

3. A process according to claim 1 in which the copolymerizable reaction is conducted in the presence of from 0.01 to 100%, based on the weight of copolymerizable material, of a buffering agent.

4. A process for treating areas of soil and subterranean formations which comprises applying to said areas a copolymerizable mixture comprising (a) N,N'-methylene bisacrylamide and (b) acrylamide, the relative weight of (a) to (b) being within the range of from about 0.005:1 to about 0.3:1, respectively and converting said polymerizable mixture to a substantially water-insoluble state by a copolymerizable reaction in the presence of a polymerization control system comprising a catalyst and from about .01 to about 50% based on the weight of the copolymerizable material, of a compound selected from the group consisting of metal ferrocyanides and ferricyanides as gelation inhibitor.

5. The process of claim 4, wherein (b) is methylol acrylamide.

6. The process according to claim 1 wherein the cyanide is potassium ferricyanide.

7. The process according to claim 1 wherein the cyanide is sodium ferrocyanide.

8. The process according to claim 4 wherein the copolymerizable reaction is conducted in the presence of from about 0.1 to about 100% of a buffering agent.

9. A process for treating areas of soil and subterranean formations which comprises applying to said areas a copolymerizable mixture comprising (a) N,N'-methylene bisacrylamide and (b) acrylamide, the relative weight of (a) to (b) being within the range of from about 0.005:1 to about 0.3:1, respectively and converting said polymerizable mixture to a substantially water-insoluble state by a copolymerizable reaction in the presence of a polymerization control system comprising from about 0.1% to about 25% of a catalyst, from about 0.1% to about 10% of a compound selected from the group consisting of ferrocyanides and ferricyanides as gelation inhibitor and from about 1 to about 100% of disodium hydrogen phosphate.

10. A process for treating areas of soil and subterranean formations which comprises applying to said areas a copolymerizable mixture comprising (a) N,N'-methylene bisacrylamide and (b) acrylamide, the relative weight of (a) to (b) being within the range of from about 0.005:1 to about 0.3:1, respectively and converting said polymerizable mixture to a substantially water-insoluble state by a copolymerizable reaction in the presence of a polymerization control system comprising from about 0.5% to about 10% of a catalyst, from about 0.1% to about 10% of a compound selected from the group consisting of ferrocyanides and ferricyanides as gelation inhibitor and sufficient amounts of a buffering agent to provide a pH of between 7 and 10.5 in the polymerizable mixture.

11. In the process of drilling into earth formations, the steps which comprise sealing a strata in the earth by injecting into the earth a copolymerizable mixture comprising (a) a monomeric alkylidene bisacrylamide of the formula

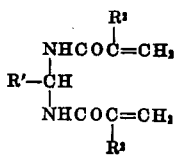

in which

is a hydrocarbon residue of an aldehyde and $R^2$ is of the group consisting of hydrogen and methyl, and (b) another ethylenic monomer copolymerizable with (a) the relative weight of (a) to (b) being within the range of from about 0.005:1 to about 0.3:1, respectively and converting said polymerizable mixture to a substantially water-insoluble state by a copolymerizable reaction in the presence of a polymerization control system comprising a catalyst and from about 0.1% to about 10% based on the weight of the copolymerizable material, of a compound selected from the group consisting of metal ferrocyanides and ferricyanides as gelation inhibitor.

12. In the process of drilling into earth formations, the steps which comprise sealing a strata in the earth by injecting into the earth a copolymerizable mixture comprising (a) N,N'-methylene bisacrylamide and (b) acrylamide, the relative weight of (a) to (b) being within the range of from about 0.005:1 to about 0.3:1, respectively and converting said polymerizable mixture in situ to a substantially water-insoluble state by a copolymerizable reaction in the presence of a polymerization control system comprising from about 0.1% to about 25% of a catalyst, from about 0.1% to about 10% potassium ferricyanide as gelation inhibitor and from about 1 to about 100% of disodium hydrogen phosphate.

13. In the process of drilling into earth formations, the steps which comprise sealing a porous and fissured strata in the earth by injecting into the earth a copolymerizable mixture comprising (a) N,N'-methylene bisacrylamide and (b) acrylamide, the relative weight ratios of (a) to (b) being 5:95 parts respectively and converting said polymerizable mixture in situ to a substantially water-insoluble state by copolymerizable reaction wherein a polymerization control system is included in said mixture, said control system comprising from about 0.5% to about 10% of a catalyst, from about 0.1% to about 10% of potassium ferricyanide and sufficient amounts of a buffering agent to provide a pH of between 7 and 10.5 in the polymerizable mixture.

References Cited in the file of this patent

UNITED STATES PATENTS

| | | |
|---|---|---|
| 2,625,537 | Kolhoff et al. | Jan. 13, 1953 |
| 2,787,604 | Miller | Apr. 2, 1957 |
| 2,801,985 | Roth | Aug. 6, 1957 |